Aug. 24, 1954 W. F. ALLER 2,687,038
GAUGING DEVICE FOR BEARINGS
Filed Oct. 8, 1949 2 Sheets-Sheet 1
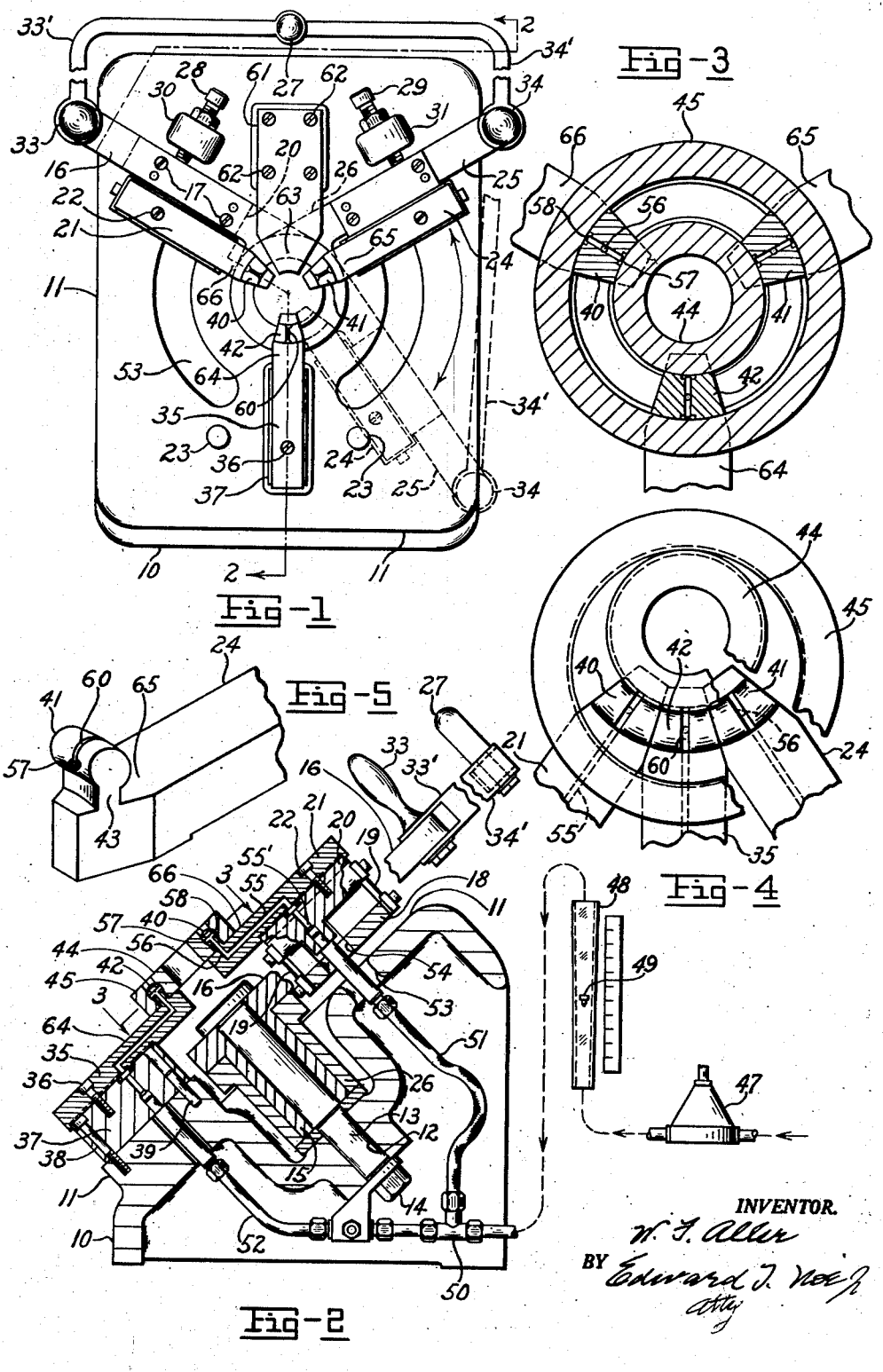
INVENTOR.
W. F. Aller
BY Edward J. Noe
Atty Aug. 24, 1954 W. F. ALLER 2,687,038
GAUGING DEVICE FOR BEARINGS
Filed Oct. 8, 1949 2 Sheets-Sheet 2
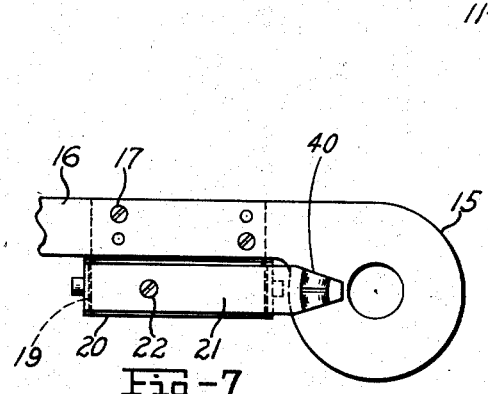
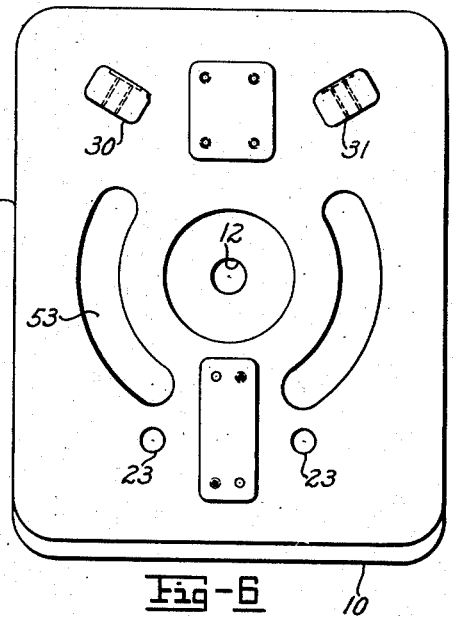
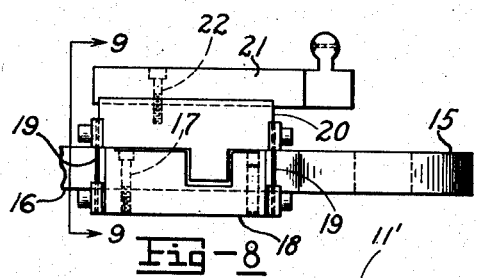
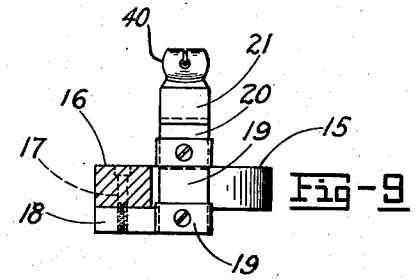
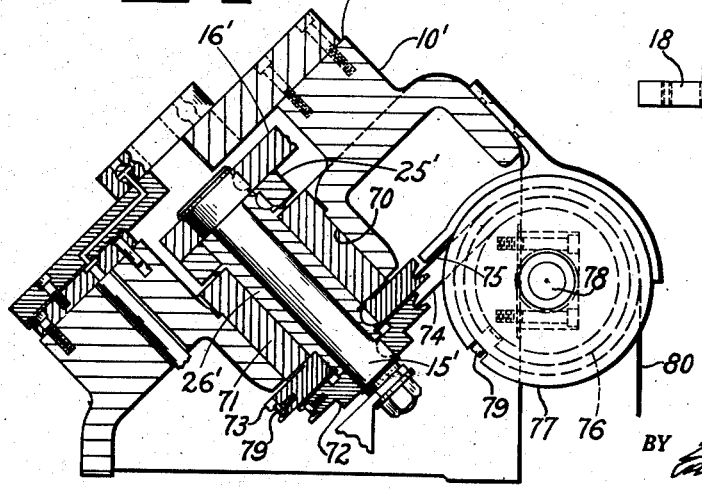
INVENTOR.
W. F. Aller
BY Edward T. Noe Jr.
atty.

Patented Aug. 24, 1954

2,687,038

UNITED STATES PATENT OFFICE 2,687,038

GAUGING DEVICE FOR BEARINGS

Willis Fay Aller, Dayton, Ohio, assignor to The Sheffield Corporation, Dayton, Ohio, a corporation of Ohio Application October 8, 1949, Serial No. 120,402

18 Claims. (Cl. 73—37.5)

This invention relates to gauging devices and more particularly to devices for gauging the size of a part, such as an antifriction bearing raceway, so that the size of another part, such as a roller or ball to be used therewith can be accurately determined.

One object of the invention resides in apparatus for determining the size of antifriction members to be employed with antifriction bearing races, in which inner and outer bearing races are arranged eccentrically one within the other so as to leave an opening of substantial size at one side of the inner race for the reception of a plurality of gauging and centering devices which are subsequently spread apart to assume widely spaced locations on opposite sides of the bearing axis and thus center the races one with respect to the other, and then measuring the distance between the races.

Another object of the invention is the provision of gauging apparatus for use with cooperating parts, and employing a plurality of gauging heads of such size and shape as to substantially interfit between the parts, such heads being operably mounted on a support for movement from adjacent loading positions to gauging positions in which they are widely spaced apart, the heads being provided with gauging means so that the distance between the parts can be accurately determined.

Another object is the provision of a gauging apparatus of the character mentioned in which the gauging heads have fluid passages providing for the leakage of fluid supplied under pressure in accordance with the distance between the parts, with means for gauging the flow of fluid through the passages.

Another object is the provision of an apparatus of the character mentioned in which the gauging heads are of segmental torus shape and interfit the inner and outer raceways of ball bearing races with a suitable operating clearance.

Another object is the provision of a gauging apparatus of the character mentioned in which the gauging heads are mounted for relative movement substantially radially of the bearing.

Other objects and advantages of the invention will be apparent from the following description, the appended claims, and the accompanying drawing, in which, Fig. 1 is a view of a gauging apparatus embodying the present invention and looking axially of the gauged parts;

Fig. 2 is a section on the line 2—2 of Fig. 1 and showing the connection to a flow gauging device;

Fig. 3 is a section on an enlarged scale on the line 3—3 of Fig. 2;

Fig. 4 is a view on an enlarged scale of bearing races that may be gauged and of the centering and gauging devices in the loading position;

Fig. 5 is a detail view on an enlarged scale showing one of the gauging heads and its carrying arm;

Fig. 6 is a detail view showing the gauge base;

Figs. 7 to 9 are details showing the movable arm 16 and the spring supported arm 21 which it carries;

Fig. 10 is a detail showing an angle block; and

Fig. 11 is a central vertical section of a modification arranged for foot operation.

In accordance with the present invention a pair of cooperating parts such as the bearing races of an antifriction bearing before being assembled with the antifriction bearing members may be gauged so as to accurately determine the average distance between the raceways of the races in order that antifriction members of the proper diameter may be used with such raceways. While in the particular embodiment of the invention illustrated the invention is shown in its application to ball bearings, it will be evident that the invention is not limited to that particular application.

Referring more particularly to Figs. 1 to 9 of the drawing in which the same reference numerals designate like parts in the different views, the gauge base 10 is provided with an upper inclined wall 11 having a central inclined passage 12 receiving a stationary shaft 13 which is removably held in place by the holding nut 14 threaded on the end of the shaft. Rotatably mounted on the shaft 13 is an inner sleeve 15 having an arm 16. Fixed to the lower side of the arm 16 as by means of screws 17 shown in Fig. 1 is a plate 18 which is connected by means of a pair of parallel flat spring blades 19 to a carrying block 20. A radially extending arm 21 is fastened to the carrying block 20 by screw 22. The spring blades 19 support the arm 21 for limited radial movement on the arm 16 and it will be apparent that since the sleeve 15 is rotatably supported on the shaft 13 the position of the arm 21 can be adjusted from the position shown in full lines in Fig. 1 to a lowered position in which it is near the lower portion of the wall 11 of the base and against a stop 23.

Operably mounted on the base 10 is another arm, as shown at 24, connected through parallel spring blades to an arm 25 in the same manner that the arms 21 and 16 are connected. The arm 25 projects outwardly from the end portion of an outer sleeve 26 which is rotatably mounted on the sleeve 15. Stop screws 28 and 29 adjustably carried in brackets 30 and 31 limit the travel of the arms 16 and 25 in an upward direction. Dotted lines shown in Fig. 1 represent the position assumed by the arms 24 and 25 when they are lowered into loading position. Either or both of the arms 16 and 25 may be moved by the operator by means of handles 33 and 34 connected through pivotally interconnected links 33' and 34' to a common handle 27 which may be moved to simultaneously and equally adjust both of the arms 16 and 25.

On the lower portion of the wall 11 of the base is a stationary arm 35 held in place by attaching screw 36 on a spacing block 37 which is attached by means of a screw 38 and dowel 39 to the gauge base. Directly opposite the arm 35 is a rest plate 61 held on the wall 11 by screws 62. The upper flat surface 63 of this rest plate lies in the same inclined plane that contains the surface 64 of arm 35 and surfaces 65 and 66 of arms 24 and 21 respectively.

The three arms 21, 24 and 35 are each provided with a gauging and spacing head, these heads bearing reference numerals 40, 41 and 42 respectively and being of similar construction. The head 41 of the arm 24 shown in Fig. 5 is approximately the shape of a torus segment and is of such size and shape as to fit with an operating clearance between the inner and outer raceways of antifriction bearing races to be gauged. The head 41 is connected to arm 24 by means of a finger 43 having a width, as will be apparent from Fig. 2, so that it may be received with operating clearance between the inwardly extending flanged portions of the races when the races are concentrically arranged with respect to one another.

It will now be obvious that the three gauging and centering heads 40, 41 and 42 may be moved relatively by the operator so that they assume closely adjacent positions as shown in Fig. 4 merely by lowering the two arms 16 and 25. This is the loading position of these members and in such positions they are adapted to support the lower side of the inner bearing race 44. The fingers 43 are of such length that the side of the inner race rests against the outer plane surfaces 64, 65 and 66 of the arms that carry the gauging and centering heads and against the surface 63 of the rest plate 61. The inner race then assumes an inclined position as shown in Fig. 2. The outer bearing race 45 is then placed on the upper side of the inner race, the two races being eccentric so that there is a considerable space between the inner and outer races and below the inner race. The rear side of the outer race, in this position of the parts, is also resting against outer surfaces of the arms that carry the gauging and centering heads. The operator then grasps the handle 27 and moves it upwardly so as to swing the two heads 40 and 41 to predetermined positions in which they are widely spaced from the head 42 and preferably to a position where the three heads are equally spaced apart as determined by the stops 28 and 29. As the heads 40 and 41 move upwardly about the axis of the shaft 13 they act on the raceway of the outer race so as to lift the outer race and centralize it with the inner race. If desired, the lower part of both races may be pressed against the head 42 as the handle 27 is raised. The parts thus assume the position indicated in Fig. 3, and in this position even if either one of the other of the races may be considerably oversize or undersize, the heads 40 and 41 will not be caused to bear tightly against either race since the spring blade mountings of the two upper arms permit them to yield radially and assume a substantially free position inside the races.

The gauging heads are provided with gauging means so that the average distance between the raceways in the plane of symmetry can be determined. Thus the size of the ball or other antifriction members to be used with the two races can be accurately determined and the proper selection made. As shown, the gauging is accomplished by measuring the fluid flow that takes place through passages in the heads that terminate adjacent the inner and outer raceways in the plane of symmetry, the relative diameters of the raceways determining the amount of leakage that takes place through the terminal openings. Air under pressure is supplied through a suitable pressure regulator 47 and then through a flow determining means, which in the example shown is illustrated as an upwardly tapered tube 48 having a float or indicator 49, the height assumed by the indicator in the tube giving an indication of the amount of flow taking place through the tube at any time. The upper end of the tube is connected to a coupling member 50 through which air is supplied to a tube 52 and two flexible conduits or hose connections one of which is indicated in Fig. 2 at 51. These flexible conduits 51 are similarly connected to gauging passages in the gauging heads 40 and 41. The conduit 51 for the head 40 extends freely through an arcuate slot 53 in the base, through a clearance hole 54 in the plate 18 and communicates with a passage 55' in the carrying block 20. Passage 55' communicates in turn with a passage 55 in the arm 21 and this passage communicates with a passage 56 leading to a transversely extending passage in the head 40. The transverse passage terminates in discharge openings 57 and 58 which are recessed a few ten thousandths of an inch inwardly of the gauging head. Air discharge channels 60 are cut in the outer portions of the gauging head to extend between points closely adjacent the discharge openings 57 and 58 for the release of the air coming from the passage 56. It will be obvious that the distance between the inner and outer raceways will determine the amount of leakage taking place through the discharge openings. The tube 52 extends through the wall 11 to a passageway through the block 37, see Fig. 2, and communicates with a gauging passage in the head 42. Since each gauging head is provided with a similar gauging passage as shown in Fig. 3, all connected to the supply fitting 50, the measurement of the fluid flow taking place gives the average distance between the raceways so that by suitably calibrating the indication of the flow measuring device or by comparing the indication obtained for any cooperating pair of bearing races with that obtained when setup masters are used, the size of the ball or other antifriction members that should be used with the particular raceways gauged can be accurately determined.

The operator does not need to know the exact size of either the inner raceway or the outer raceway. Either one may be slightly larger or smaller than an exact standard but by comparing and gauging an outer race directly with the cooperating inner race it will be assembled with, the exact size of the balls to be used with those races can be determined and balls of the proper size can be selected in the actual assembling operation. In the gauging operation when the gauging and centering heads are being spread apart to center the races the outer race is moved upwardly with no tendency for the gauging and centering heads to bind between the races, and after being spread apart it will be obvious that there is no undue pressure created in any direction by any of the gauging parts since the two upper gauging heads are freely movable in radial directions by means of the spring blades and can adjust themselves with respect to the bearing. It will also be obvious that since the races are checked with the bearing axis at an angle to the vertical the races will tend to arrange themselves so that the central planes of the raceways are centralized.

While it is preferred to check or gauge a pair of races that will be assembled into a complete bearing directly with one another, it will be obvious that either the inner race or the outer race can be made as a standard against which other races are gauged and in such event the race that serves as a standard will be used continuously with the other type races and the gauged parts will be suitably classified as to size and then selected and matched in accordance with their actual size.

The arms 35 can be very conveniently removed and replaced by other arms having gauging and centering heads of such size and shape as to accommodate bearing races of different widths and diameter. This substitution of the gauging arms can be effected merely by removing the connecting screws such as the screw 22 and replacing the arm with another having the proper size gauging head. In making such substitutions a pressure tight seal between the passages 55 and 55' for example is accomplished by means of a yielding seal ring of rubber or other suitable yielding material.

Fig. 11 shows a modified construction in which the movable arms are connected to be moved by a control cable which may be moved by the foot of the operator. In this form of construction the base 10' has an upper inclined wall 11' which is centrally recessed to provide a bore 70 in which is a bearing sleeve 71. Rotatable in this sleeve is a hollow shaft 26' which is fixed to an arm 25' and rotatable within the hollow shaft is a central shaft 15' which is fixed to an arm 16'. The two arms 16' and 25' are similar in construction and functional operation to the arms 16 and 25 of the modification first described except that the links 33' and 34' are not employed. It will be understood that the arms 16' and 25' support gauging devices which are also similar to the construction first described.

The shaft 15' is keyed to a wheel 72 and the hollow shaft 26' is keyed to a wheel 73. These two wheels are simultaneously rotated in opposite directions and through equal angular travel by means of cables 74 and 75 extending to axially spaced pulley wheels 76 and 77 which are fixed to a shaft 78. Clamp screws 79 fasten the ends of the cables to the various wheels. A control cable 80 is wrapped around the pulley wheel 77 and by operating the cable 80 the two pulleys 76 and 77 are rotated in the same direction to move the two arms 16' and 25' in opposite directions, it being understood that the diameters of the pulley wheels 72 and 73 are so proportioned with respect to the diameters of the pulley wheels 76 and 77 as to produce equal movement of the two arms 16' and 25'. The control cable 80 may be pulled down by depressing a foot treadle so as to swing the arms 16' and 25' upwardly; or the cable 80 may be connected to a weight, the force of which can be overcome by the foot treadle to permit the arms 16' and 25' to move downwardly from a normal raised position in which they are held by the weight mentioned.

While the forms of apparatus herein described constitute preferred embodiments of the invention, it is to be understood that the invention is not limited thereto, and that changes may be made therein without departing from the scope of the invention which is defined in the appended claims.

What is claimed is:

1. Gauging apparatus for antifriction bearings to gauge the inner and outer races for the determination of the size of antifriction members to be used therewith, comprising a support, gauging heads carried by said support and of such size and shape as to substantially interfit between the raceways of the races when the races are concentric, the inner portions of the heads having a curvature approximating the curvature of an inner raceway and the outer portions of the heads having a convexity in a direction annular of the raceway approximating the curvature of the adjacent portions of an outer raceway, said heads having fluid passages the ends of which cooperate with the raceways to provide for leakage of fluid supplied under pressure, means for mounting said heads for movement on said support so that the heads can be arranged in spaced locations with the ends of their fluid passages facing the adjacent surfaces of the inner and outer races, and means for gauging the flow through said passages.

2. Gauging apparatus for gauging a dimensional relationship between a pair of cooperating parts which are adapted to cooperate one within the other with a nominal radial spacing therebetween, comprising a support, gauging heads of such size and shape as to substantially interfit between cooperating parts to be gauged, the dimensions of said heads in a direction radially of the parts being slightly less than the nominal distance between said parts and the outer and inner portions of said heads being curved substantially in accordance with the curvature of the outer and inner parts adjacent said heads, said heads having fluid passages the ends of which face towards and cooperate with the parts to provide for leakage of fluid supplied under pressure, means for gauging the flow through said passages and means carrying said heads on said support for relative movement from positions in which they are closely adjacent one another to predetermined positions in which they are spaced apart.

3. Gauging apparatus of the character described comprising a support, a plurality of gauging members on said support and each having a head of such size as to be operable between concentrically arranged inner and outer cooperating annular parts, means for mounting said gauging members on said support for relative movement from a zone in which they are adjacent one another to predetermined locations in which they are angularly spaced apart within the outer annular part, stop means on said support to determine the locations to which the gauging members are moved, said heads having means for gauging the distance between the parts.

4. An antifriction bearing gauge comprising a support, a plurality of gauging members on said support and each having a head operable between the raceways of concentrically arranged inner and outer cooperating ball bearing races, the radial dimension of the heads being slightly less than the size of the ball usable with the races, means for mounting said gauging members on said support for relative movement from a zone in which they are adjacent one another to locations in which they are spaced apart angularly within the outer race, at least one of said heads having a fluid passage terminating in diametrically opposed leakage openings facing the inner and outer races and providing for leakage of pressure-supplied fluid in accordance with the relative spacing of the raceways.

5. An antifriction bearing gauge comprising a support, a plurality of gauging members having heads of such size as to be operable between the raceways of concentrically arranged inner and outer cooperating bearing races, fingers supporting said heads and of such size as to be operable between the inner and outer races, means for mounting said fingers on said support for movement about a fixed axis so they can be moved from a zone in which they are closely adjacent one another to locations in which they are angularly spaced apart within the outer race, means for supporting at least one of said fingers for movement substantially radially with respect to said axis, said heads having means for gauging the distance between the raceways.

6. Gauging apparatus for antifriction bearing races comprising a support, gauging heads of such size and shape as to substantially interfit the raceway of an antifriction bearing race, the inner portions of the heads having a curvature approximating the curvature of an inner raceway and the outer portions of the heads having a convexity in a direction annular of the raceway approximating the curvature of the adjacent portions of an outer raceway, said heads having fluid passages the ends of which face radially of the races and cooperate with inner and outer surfaces of the raceway to provide for leakage of fluid supplied under pressure, means for gauging the flow through said passages, and means for carrying said heads on said support for relative movement in substantially the same plane from positions in which they are adjacent one another to positions in which they are widely spaced angularly within the raceway.

7. An antifriction bearing gauge comprising a support, three gauging members on said support and each having a head of a size radially that is less than the normal ball size and operable in the raceway of a ball bearing race, means mounting said gauging members on said support for relative movement about an inclined axis from a zone in which they are adjacent one another to locations in which they are spaced 120 degrees apart angularly within the race, at least one of said heads having means for gauging the diameter of the raceway of said race.

8. An antifriction bearing gauge comprising a support, a plurality of gauging members having heads of such size as to be operable between the raceways of concentrically arranged inner and outer cooperating bearing races, fingers supporting said heads and of such size as to be operable between the inner and outer races, means for mounting said fingers on said support for relative movement about a fixed axis from a zone in which they are closely adjacent one another to locations in which they are angularly spaced apart within the outer race, means for supporting at least one of said fingers for movement substantially radially of the races, said heads having fluid gauging passages extending radially of said axis for cooperation with both of said races.

9. An antifriction bearing gauge comprising a support, a plurality of gauging members on said support and each having a head of such size as to be operatble between the raceways of concentrically arranged inner and outer cooperating bearing races, means for mounting said gauging members on said support for relative movement about an inclined axis from a zone in which they are adjacent one another to locations in which they are angularly spaced apart within the outer race, said heads having fluid gauging passages extending radially of said axis and cooperating with both of said races for gauging the distance between the said raceways, and means including said support and said gauging members serving to locate the races in an inclined position and resting on said heads.

10. In an antifriction bearing gauge for gauging the raceway of an antifriction bearing, a gauging arm having a head of segmental torus shape adapted for interfitting engagement with the concentrically arranged raceways of a ball bearing race, said head being of small annular extent as compared with a semicircle.

11. A gauging member adapted for use on an antifriction bearing gauge, said member comprising a gauging arm having a head of segmental torus shape adapted for interfitting engagement with the raceway of a ball bearing race, said head having an air passage extending radially with respect to the torus center and terminating in leakage orifices at opposite sides thereof, for the purpose described.

12. Gauging apparatus for antifriction bearings comprising a support, a pair of movable gauging members, a stationary gauging member on said support, said members having heads of such size as to be operable between the raceways of concentrically arranged inner and outer bearing races, fingers connecting said heads to said gauging members and of such size as to be operable between the inner and outer races, means pivotally mounting said movable members on said support for movement about a fixed axis from a zone in which said heads are adjacent one another to positions in which the heads on the movable members are substantially 120 degrees from the head on the stationary member and from each other, means supporting at least one of said members for limited yielding movement radially with respect to said fixed axis, said heads having fluid gauging passages extending substantially radially with respect to said axis and adapted to provide for a leakage of fluid supplied under pressure so as to gauge a diametrical bearing race measurement, and means connected to said fluid gauging passages for gauging the flow through said passages.

13. Gauging apparatus for ball bearings comprising a support having a front wall, a pair of movable gauging arms, a stationary gauging arm on said support, said arms each having a head of such size as to be operable between the raceways of concentrically arranged inner and outer ball bearing races, fingers each connecting one of said heads to one of said arms and of such size as to be operable between the inner and outer races, means pivotally mounting said movable arms on said support for movement about a fixed axis perpendicular to said wall from a zone in which said heads are adjacent one another to positions in which the heads on the movable arms are substantially 120 degrees from the head on the stationary arm and from each other, means supporting at least one of said arms for limited yielding movement radially with respect to said fixed axis, said heads each having a pair of opposed fluid gauging passages extending substantially radially with respect to said axis and adapted to provide for a leakage of fluid supplied under pressure so as to gauge the average diametrical distance between the bearing races in the central transverse plane of the races, and means for gauging the flow through said passages.

14. Gauging apparatus for gauging a dimensional relationship between inner and outer antifrictional bearing raceways comprising a plurality of gauging heads of such size and shape as to substantially interfit between such raceways when concentrically arranged one within the other, at least two of said gauging heads each having a fluid passage with discharge openings arranged radially of the bearing raceway axis at opposite sides of the head so the openings cooperate with the inner surface of the outer raceway and outer surface of the inner raceway to provide for a measurable leakage of fluid supplied under pressure, and supporting means for said gauging heads.

15. Gauging apparatus for gauging the distance between a pair of antifrictional bearing races, comprising a support and a plurality of gauging heads carried by said support, said heads being of such size as to substantially interfit at different spaced gauging locations between the raceways of concentrically arranged inner and outer races, said heads having fluid passages terminating in leakage orifices adjacent the inner and outer raceways to provide leakage of fluid supplied under pressure to said heads, the portions of said heads adjacent the inner and outer raceways being curved throughout a substantial length substantially in accordance with the curvatures of said raceways, and means for gauging the flow through said passages.

16. Gauging apparatus for gauging the distance between a pair of antifriction bearing races, comprising a support and a plurality of gauging heads carried by said support, said heads being of such size as to substantially interfit at different spaced gauging locations between the raceways of concentrically arranged inner and outer races, said heads having fluid passages terminating in leakage orifices adjacent the inner and outer raceways to provide leakage of fluid supplied under pressure to said heads, means for mounting at least one of said heads on said support for movement in a direction substantially radially of the raceways, and means for gauging the flow through said passage.

17. Gauging apparatus for gauging the distance between a pair of antifriction bearing races comprising a support and a plurality of gauging heads carried by said support in an annular series the mean diameter of which substantially corresponds to the mean diameter of the space between the raceways of the races, said heads being of such size as to substantially interfit between the raceways of concentrically arranged inner and outer races but with a small clearance from said raceways, said heads having fluid passages terminating in leakage orifices adjacent the inner and outer raceways to provide leakage of fluid supplied under pressure to said heads, the portions of said heads adjacent the inner and outer raceways being curved substantially concentrically with said raceways throughout a substantial length, and means for gauging the flow through said passages.

18. Gauging apparatus for gauging the distance between a pair of antifriction bearing races, comprising a support and a plurality of gauging heads carried by said support, said heads being of such size as to substantially interfit at different spaced gauging locations between the raceways of concentrically arranged inner and outer races, a plurality of said heads each having gauging means controlled by the adjacent surfaces of the races in accordance with the distance between the races adjacent said heads, a gauging instrument, and means including a common connection from the gauging instrument to each of these gauging means to gauge the average radial displacement between the races.

References Cited in the file of this patent

UNITED STATES PATENTS

| Number | Name | Date |
|---|---|---|
| 1,446,149 | Benoit et al. | Feb. 20, 1923 |
| 2,024,020 | Aldeborgh | Dec. 10, 1935 |
| 2,419,280 | Neff | Apr. 22, 1947 |
| 2,431,087 | Subber | Nov. 18, 1947 |
| 2,456,806 | Wolffe | Dec. 21, 1948 |
| 2,479,606 | Douglass | Aug. 23, 1949 |
| 2,525,068 | Ericson et al. | Oct. 10, 1950 |
| 2,620,653 | Mennesson | Dec. 9, 1952 |
| 2,636,379 | Van Dorn | Apr. 28, 1953 |

FOREIGN PATENTS

| Number | Country | Date |
|---|---|---|
| 50,044 | Sweden | Aug. 25, 1919 |
| 255,024 | Great Britain | Oct. 14, 1926 |

OTHER REFERENCES

American Machinist, page 116, April 12, 1945.